United States Patent
Yoshiyama et al.

(10) Patent No.: US 12,110,384 B2
(45) Date of Patent: Oct. 8, 2024

(54) CHLORINATED VINYL CHLORIDE RESIN COMPOSITION FOR WINDOW FRAME, AND WINDOW FRAME MEMBER

(71) Applicants: SEKISUI CHEMICAL CO., LTD., Osaka (JP); TOKUYAMA SEKISUI CO., LTD., Osaka (JP)

(72) Inventors: Kei Yoshiyama, Yamaguchi (JP); Hiroshi Taniguchi, Yamaguchi (JP)

(73) Assignees: SEKISUI CHEMICAL CO., LTD., Osaka (JP); TOKUYAMA SEKISUI CO., LTD., Osaka (JP)

( * ) Notice: Subject to any disclaimer, the term of this patent is extended or adjusted under 35 U.S.C. 154(b) by 697 days.

(21) Appl. No.: 17/277,048

(22) PCT Filed: Sep. 26, 2019

(86) PCT No.: PCT/JP2019/037922
§ 371 (c)(1),
(2) Date: Mar. 17, 2021

(87) PCT Pub. No.: WO2020/067317
PCT Pub. Date: Apr. 2, 2020

(65) Prior Publication Data
US 2021/0371639 A1    Dec. 2, 2021

(30) Foreign Application Priority Data
Sep. 28, 2018 (JP) ................. 2018-185636

(51) Int. Cl.
| | |
|---|---|
| C08L 27/24 | (2006.01) |
| C08L 9/06 | (2006.01) |
| C08L 27/06 | (2006.01) |
| C08L 33/08 | (2006.01) |
| C10M 105/34 | (2006.01) |
| E06B 1/26 | (2006.01) |

(52) U.S. Cl.
CPC .............. *C08L 27/24* (2013.01); *C08L 9/06* (2013.01); *C08L 27/06* (2013.01); *C08L 33/08* (2013.01); *C10M 105/34* (2013.01); *E06B 1/26* (2013.01)

(58) Field of Classification Search
CPC ........ C08L 27/24; C08K 5/0041; C08K 3/013
See application file for complete search history.

(56) References Cited

U.S. PATENT DOCUMENTS

| | | | |
|---|---|---|---|
| 6,174,360 B1 * | 1/2001 | Sliwinski | C09C 3/06 106/286.2 |
| 7,928,169 B2 | 4/2011 | Dalal et al. | |
| 2003/0018112 A1 | 1/2003 | Okuhara et al. | |
| 2005/0072114 A1 * | 4/2005 | Shiao | E04D 1/26 52/782.1 |
| 2010/0331491 A1 * | 12/2010 | Kitayama | C08L 27/06 525/55 |
| 2014/0336321 A1 * | 11/2014 | Yamasugi | C08K 3/04 524/296 |
| 2017/0183491 A1 | 6/2017 | Matsumura et al. | |
| 2018/0355081 A1 | 12/2018 | Hirota et al. | |

FOREIGN PATENT DOCUMENTS

| | | | | |
|---|---|---|---|---|
| CN | 104385735 | | 3/2015 | |
| CN | 105566822 | | 5/2016 | |
| CN | 106221620 A | * | 12/2016 | .............. C09J 11/04 |
| JP | 2000-328844 | | 11/2000 | |
| JP | 2001-164067 | | 6/2001 | |
| JP | 2002-053726 | | 2/2002 | |
| JP | 2002-138179 | | 5/2002 | |
| JP | 2002-284951 | | 10/2002 | |
| JP | 2002-284952 | | 10/2002 | |
| JP | 3462559 | | 11/2003 | |
| WO | 2010/150608 | | 12/2010 | |
| WO | 2016/013638 | | 1/2016 | |
| WO | 2017/145864 | | 8/2017 | |

OTHER PUBLICATIONS

Espacenet Translation of JP2002284951A (Year: 2023).*
International Search Report issued Dec. 24, 2019 in International (PCT) Patent Application No. PCT/JP2019/037922.

* cited by examiner

*Primary Examiner* — Michael M Dollinger
(74) *Attorney, Agent, or Firm* — Wenderoth, Lind & Ponack, L.L.P.

(57) ABSTRACT

The present invention provides a chlorinated vinyl chloride resin composition for a window frame having excellent properties including moldability, heat resistance, and impact resistance and capable of preventing or reducing deformation such as warpage or damage even after exposure to sunlight for a long time. Provided is a chlorinated vinyl chloride resin composition for a window frame, containing a chlorinated vinyl chloride resin and an infrared reflective pigment.

12 Claims, No Drawings

CHLORINATED VINYL CHLORIDE RESIN COMPOSITION FOR WINDOW FRAME, AND WINDOW FRAME MEMBER

TECHNICAL FIELD

The present invention relates to a chlorinated vinyl chloride resin composition for a window frame having excellent properties including moldability, heat resistance, and impact resistance and capable of preventing or reducing deformation such as warpage or damage even after exposure to sunlight for a long time.

BACKGROUND ART

Vinyl chloride resins excellent in mechanical strength, weather resistance, and chemical resistance have been conventionally widely used as materials of resin molded articles used as housing materials such as window frames. Production of such resin molded articles in complicated shapes is easy. Moreover, such resin molded articles have superior anti-dew condensation properties as compared to window frames made of a metal such as aluminum to exhibit excellent properties including weather resistance, heat insulation properties, and chemical resistance. Vinyl chloride resins however have low heat resistance temperatures. To counter the situation, chlorinated vinyl chloride resins have been developed by chlorinating vinyl chloride resins to improve their heat resistance.

Vinyl chloride resins and chlorinated vinyl chloride resins have poor impact resistance. In the case where they are used as materials of resin molded articles used outdoors, such as window frames, the molded articles may be deteriorated by heat and light of sunlight to be unfortunately damaged upon application of an impact.

To approach this situation, Patent Literature 1 discloses that the use of a profile containing a chlorinated vinyl chloride resin and chlorinated polyethylene and prepared by extrusion within a predetermined shear range can improve the impact resistance, as well as improves a molded article with an excellent appearance.

Patent Literature 2 discloses that the impact resistance and appearance of a molded article can be improved by the use of a combination of a vinyl chloride resin and core-shell particles having a core component obtained by a reaction of a monomer mixture containing predetermined amounts of alkyl acrylate, a polyfunctional monomer, and a monomer copolymerizable with these.

CITATION LIST

Patent Literature

Patent Literature 1: JP 3462559 B
Patent Literature 2: WO 2010/150608

SUMMARY OF INVENTION

Technical Problem

According to Patent Literatures 1 and 2, the impact resistance is improved. However, the molded articles heated by sunlight store heat to release the residual stress thereof, resulting in warpage in the molded articles or breakage of the molded articles. Moreover, chlorinated vinyl chloride resins having poorer flowability than vinyl chloride resins unfortunately have poor moldability.

The present invention aims to provide a chlorinated vinyl chloride resin composition for a window frame having excellent properties including moldability, heat resistance, and impact resistance and capable of preventing or reducing deformation such as warpage or damage even after exposure to sunlight for a long time.

Solution to Problem

The present invention relates to a chlorinated vinyl chloride resin composition for a window frame, containing a chlorinated vinyl chloride resin and an infrared reflective pigment.

The present invention is specifically described below.

The present inventors made intensive studies to find out that a chlorinated vinyl chloride resin composition for a window frame containing a chlorinated vinyl chloride resin, when further containing an infrared reflective pigment, exhibits excellent thermal stability and impact resistance and can prevent or reduce deformation such as warpage or damage even after exposure to sunlight for a long time. Thus, the present invention was completed.

(Chlorinated Vinyl Chloride Resin)

The chlorinated vinyl chloride resin composition for a window frame of the present invention contains a chlorinated vinyl chloride resin.

The chlorinated vinyl chloride resin composition containing a chlorinated vinyl chloride resin can provide a molded article having sufficiently improved heat resistance, as well as exhibiting better molding processability.

The lower limit of the chlorine content of the chlorinated vinyl chloride resin is 63% by weight and the upper limit thereof is preferably 69% by weight.

When the chlorine content is 63% by weight or more, the resulting molded article can have sufficient heat resistance. When the chlorine content is 69% by weight or less, the moldability of the resin composition containing the chlorinated vinyl chloride resin can be sufficiently improved.

The lower limit of the chlorine content is more preferably 65% by weight and the upper limit thereof is more preferably 67.5% by weight.

The chlorine content of the chlorinated vinyl chloride resin can be measured by the method described in JIS K 7229.

Preferably, the chlorinated vinyl chloride resin contains structural units (a) to (c) represented by the formulas (a) to (c), wherein the proportion of the structural unit (a) is 17.5 mol % or less, the proportion of the structural unit (b) is 46.0 mol % or more, and the proportion of the structural unit (c) is 37.0 mol % or less, based on 100 mol % of the structural units (a) to (c) in total.

The use of such a chlorinated vinyl chloride resin can improve the thermal stability of the resulting molded article and the molding processability of the resulting resin composition upon molding.

[Chem. 1]

The molar ratio of the structural units (a), (b), and (c) in the chlorinated vinyl chloride resin reflects the sites to which chlorine is introduced in chlorination of the vinyl chloride resin. Ideally, a vinyl chloride resin before chlorination contains about 0 mol % of the structural unit (a), about 50.0 mol % of the structural unit (b), and about 50.0 mol % of the structural unit (c). Chlorination reduces the proportion of the structural unit (c) and increases the proportions of the structural units (a) and (b). If the proportion of unstable structural units (a) with large steric hindrance excessively increases, or if chlorinated sites and non-chlorinated sites are unevenly distributed in the same molecule of the chlorinated vinyl chloride resin, the non-uniformity of the state of chlorination increases. The increase in the non-uniformity significantly impairs the thermal stability of the chlorinated vinyl chloride resin.

The chlorinated vinyl chloride resin with the proportions of the structural units (a), (b), and (c) within the above ranges has high uniformity and exhibits good thermal stability.

The lower limit of the proportion of the structural unit (a) in the chlorinated vinyl chloride resin is preferably 2.0 mol % and the upper limit thereof is preferably 17.5 mol %, more preferably 16.0 mol %, based on 100 mol % of the structural units (a), (b), and (c) in total.

The lower limit of the proportion of the structural unit (b) in the chlorinated vinyl chloride resin is preferably 46.0 mol %, more preferably 53.5 mol % and the upper limit thereof is preferably 70.0 mol %, based on 100 mol % of the structural units (a), (b), and (c) in total.

The lower limit of the proportion of the structural unit (c) in the chlorinated vinyl chloride resin is preferably 1.0 mol % and the upper limit thereof is preferably 37.0 mol %, more preferably 30.5 mol %, based on 100 mol % of the structural units (a), (b), and (c) in total.

In particular, the chlorinated vinyl chloride resin with a proportion of the structural unit (b) of 58.0 mol % or more and a proportion of the structural unit (c) of 35.8 mol % or less is preferred. With such a structure, the chlorinated vinyl chloride resin can exhibit higher thermal stability.

The proportions of the structural units (a), (b), and (c) in the chlorinated vinyl chloride resin can be measured by analyzing the molecular structure by NMR. The NMR analysis can be performed in accordance with the method described in R. A. Komoroski, R. G. Parker, J. P. Shocker, Macromolecules, 1985, 18, 1257-1265.

In the molecular structure of the chlorinated vinyl chloride resin, a portion which is not chlorinated can be indicated by a structural unit (d) represented by the following formula (d). This portion herein is referred to as "VC unit".

In the chlorinated vinyl chloride resin, the upper limit of the amount of a sequence of four or more VC units in the molecular structure is preferably 30.0 mol %, more preferably 28.0 mol %, still more preferably 18.0 mol %. As used herein, the term "sequence of four or more VC units" means a portion consisting of four or more VC units joined in series.

[Chem. 2]

—CH$_2$—CHCl—                                (d)

The VC unit present in the chlorinated vinyl chloride resin can be a starting point of dehydrochlorination. VC units joined in series tend to cause a series of dehydrochlorination reactions called "zipper reaction". The greater the amount of the sequence of four or more VC units is, the more likely dehydrochlorination is to occur and the lower the thermal stability of the chlorinated vinyl chloride resin is. When the amount of the sequence of four or more VC units is not more than the preferable upper limit, reduction in thermal stability of the chlorinated vinyl chloride resin can be suppressed.

The amount of the sequence of four or more VC units in the molecular structure can be measured by the above-mentioned molecular structure analysis by NMR.

The lower limit of the average degree of polymerization of the chlorinated vinyl chloride resin is preferably 500, more preferably 700 and the upper limit thereof is preferably 1,000, more preferably 800.

When the average degree of polymerization of the chlorinated vinyl chloride resin is not less than the preferable lower limit and not more than the preferable upper limit, the flowability of the chlorinated vinyl chloride resin is sufficiently improved so that the resulting resin composition can exhibit excellent moldability.

The average degree of polymerization can be measured by the method described in JIS K 6720-2:1999.

The chlorinated vinyl chloride resin is a resin obtained by chlorinating a vinyl chloride resin.

The vinyl chloride resin may be a vinyl chloride homopolymer, a copolymer of a vinyl chloride monomer and a monomer having an unsaturated bond copolymerizable with a vinyl chloride monomer, or a graft copolymer obtained by graft-copolymerizing a polymer with a vinyl chloride monomer. These polymers may be used alone, or in combination of two or more.

Examples of the monomer having an unsaturated bond copolymerizable with a vinyl chloride monomer include α-olefins, vinyl esters, vinyl ethers, (meth)acrylic acid esters, aromatic vinyls, vinyl halides, and N-substituted maleimides. One or two or more thereof may be used.

Examples of the α-olefins include ethylene, propylene, and butylene.

Examples of the vinyl esters include vinyl acetate and vinyl propionate.

Examples of the vinyl ethers include butyl vinyl ether and cetyl vinyl ether.

Examples of the (meth)acrylic acid esters include methyl (meth)acrylate, ethyl (meth)acrylate, butyl acrylate, and phenyl methacrylate.

Examples of the aromatic vinyls include styrene and α-methylstyrene.

Examples of the vinyl halides include vinylidene chloride and vinylidene fluoride.

Examples of the N-substituted maleimides include N-phenylmaleimide and N-cyclohexylmaleimide.

Examples of the polymer graft-copolymerized with a vinyl chloride monomer may be any polymer onto which a vinyl chloride monomer can be graft-polymerized. Examples thereof include ethylene copolymers, acrylonitrile-butadiene copolymers, polyurethane, chlorinated polyethylene, and chlorinated polypropylene. These may be used alone or in combination of two or more.

Examples of the ethylene copolymers include ethylene-vinyl acetate copolymers, ethylene-vinyl acetate-carbon monoxide copolymers, ethylene-ethyl acrylate copolymers, ethylene-butyl acrylate-carbon monoxide copolymers, ethylene-methyl methacrylate copolymers, and ethylene-propylene copolymers.

The vinyl chloride resin may be polymerized by any conventionally known method such as suspension polymerization, bulk polymerization, solution polymerization, or emulsion polymerization.

The upper limit of the UV absorbance at a wavelength of 216 nm of the chlorinated vinyl chloride resin is preferably 8.0, more preferably 0.8.

In an ultraviolet absorption spectrum, the wavelength of 216 nm is the wavelength at which —CH═CH—C(═O)— and —CH=CH—CH=CH—, heterologous structures in the chlorinated vinyl chloride resin, show absorption.

The heterologous structures in the molecular chain after a chlorination reaction can be quantified from the UV absorbance of the chlorinated vinyl chloride resin and thus used as an index of the thermal stability. In the molecular structure of the chlorinated vinyl chloride resin, a chlorine atom attached to a carbon next to a double bonded carbon is unstable. This chlorine atom acts as a starting point of dehydrochlorination. Accordingly, the greater the UV absorbance at a wavelength of 216 nm is, the more likely dehydrochlorination is to occur and the lower the thermal stability is.

In particular, in the case where the chlorinated vinyl chloride resin has a chlorine content of 63% by weight or more and not more than 69% by weight, the UV absorbance is preferably 0.8 or less. When the UV absorbance is 0.8 or less, an influence by the heterologous structures in the molecular chain can be reduced, leading to suppression of a reduction in thermal stability.

In the case where the chlorinated vinyl chloride resin has a chlorine content of 69% by weight or more and not more than 72% by weight, the UV absorbance is preferably 8.0 or less. When the UV absorbance is 8.0 or less, an influence by the heterologous structures in the molecular chain can be reduced, leading to suppression of a reduction in thermal stability.

The lower limit of the time required for the amount of dehydrochlorination from the chlorinated vinyl chloride resin at 190° C. to reach 7,000 ppm (hereafter, also referred to as dehydrochlorination time) is preferably 60 seconds, more preferably 100 seconds. A longer dehydrochlorination time is preferred and the upper limit thereof is not limited.

The chlorinated vinyl chloride resin thermally decomposes at high temperatures, generating HCl gas. Generally, as the degree of chlorination of a chlorinated vinyl chloride resin increases, the amount of the above-described VC units decreases and thus the amount of dehydrochlorination tends to decrease. However, as the degree of chlorination increases, non-uniform chlorination and the amount of heterologous structures increase, reducing the thermal stability. Measurement of the amount of dehydrochlorination thus enables analysis of the non-uniform chlorination and an increase in the amount of heterologous structures. For example, the dehydrochlorination time can be used as an index of the thermal stability. The shorter the dehydrochlorination time is, the lower the thermal stability is.

In particular, in the case where the chlorinated vinyl chloride resin has a chlorine content of 63% by weight or more and not more than 69% by weight, the dehydrochlorination time is preferably 60 seconds or longer. When the dehydrochlorination time is 60 seconds or longer, the thermal stability can be sufficiently improved. The dehydrochlorination time is more preferably 70 seconds or longer, still more preferably 80 seconds or longer.

In the case where the chlorinated vinyl chloride resin has a chlorine content of 69% by weight or more and not more than 72% by weight, the dehydrochlorination time is preferably 100 seconds or longer. When the dehydrochlorination time is 100 seconds or longer, the thermal stability can be sufficiently improved. The dehydrochlorination time is more preferably 120 seconds or longer, still more preferably 140 seconds or longer.

The dehydrochlorination time can be measured as follows. One gram of the chlorinated vinyl chloride resin is put in a test tube. The resin is heated at 190° C. using an oil bath, and the generated HCl gas is recovered. The HCl gas thus recovered is dissolved in 100 mL of ion-exchanged water, followed by measurement of the pH. The HCl concentration (ppm) (i.e., how many grams of HCl are generated per 1,000,000 g of the chlorinated vinyl chloride resin) is calculated based on the pH. The time it takes for the HCl concentration to reach 7,000 ppm is measured.

In the chlorinated vinyl chloride resin composition for a window frame of the present invention, the lower limit of the amount of the chlorinated vinyl chloride resin is preferably 65% by weight, more preferably 70% by weight and the upper limit thereof is preferably 90% by weight, more preferably 85% by weight.

When the amount of the chlorinated vinyl chloride resin is not less than the preferable lower limit and not more than the preferable upper limit, the heat resistance and impact resistance of the resulting molded article can be improved.

(Infrared Reflective Pigment)

The chlorinated vinyl chloride resin composition for a window frame of the present invention contains an infrared reflective pigment.

The chlorinated vinyl chloride resin composition containing an infrared reflective pigment can provide a molded article in which heat accumulation is suppressed to prevent or reduce deformation such as warpage or damage of the molded article.

The infrared reflective pigment may be an inorganic pigment or an organic pigment. Moreover, the infrared reflective pigment may contain organic and inorganic pigments, multiple organic pigments, or multiple inorganic pigments. Among these, preferred is an organic pigment.

Examples of the inorganic pigment include silicate compounds, carbonate compounds, chromate compounds, sulfate compounds, titanate compounds, metal oxides, metal hydroxides, and metal nitrides. For obtaining a molded article particularly excellent in weather resistance and chemical resistance, preferred among these are silicate compounds, metal oxides, and carbonate compounds, more preferred are silicate compounds, still more preferred are a combination of a silicate compound and an inorganic pigment other than the silicate compound, and particularly preferred are a combination of a silicate compound and a metal oxide and a combination of a silicate compound and a carbonate compound.

Examples of the silicate compounds include silica, diatomite, calcium silicate, talc, clay, mica, montmorillonite, bentonite, activated clay, sepiolite, imogolite, sericite, and fly ash. The examples also include Pigment Blue 29 and Pigment Violet 15.

Among the inorganic pigments, examples of the inorganic pigment other than the silicate compound include alumina, zinc oxide, chromium oxide, titanium oxide, calcium oxide, magnesium oxide, iron oxide, tin oxide, antimony oxide, ferrites, calcium hydroxide, magnesium hydroxide, aluminum hydroxide, basic magnesium carbonate, calcium carbonate, magnesium carbonate, zinc carbonate, barium carbonate, dawsonite, hydrotalcite, calcium sulfate, barium sulfate, aluminum nitride, boron nitride, silicon nitride, potassium titanate, magnesium sulfate, lead zirconium titanate, aluminum borate, molybdenum sulfide, and silicon carbide. The examples further include Pigment Yellow 31, Pigment Yellow 34, Pigment Yellow 36, Pigment Yellow 42, Pigment Yellow 53, Pigment Brown 24, Pigment Blue 27, Pigment Red 108, Pigment Black 11, and Pigment White 6.

Examples of the organic pigment include condensed polycyclic pigments having a benzene ring structure and azo group-containing azo pigments.

The infrared reflective pigment preferably has a structure, substituent, or substitution site which produces black or red color.

Examples of azo pigments having such a structure include those having a naphthol skeleton or a pyrazolone skeleton. Examples of condensed polycyclic pigments having such a structure include those having a quinacridone skeleton, a perylene skeleton, an iso-indolinone skeleton, or a diketopyrrolopyrrole skeleton.

The substituent preferably does not change the level of transition energy. Specifically, those introducing an electron-withdrawing group into an electron acceptor and those introducing an electron donating group into an electron donor are not preferred.

The azo pigments are preferably those having a substituent at the meta-, ortho-, or para-position of the azo group, more preferably those having a substituent at the meta- or ortho-position of the azo group, still more preferably those having a substituent at the meta position of the azo group.

Examples of the condensed polycyclic pigments include phthalocyanine pigments, anthraquinone pigments, quinacridone pigments, indigo pigments, dioxazine pigments, perylene pigments, perinone pigments, isoindoline pigments, pyrrocoline pigments, quinophthalone pigments, and diketopyrrolopyrrole pigments.

Examples of the azo pigments include monoazo pigments and diazo pigments.

These infrared reflective pigments may be used alone or in combination of two or more.

The lower limit of the infrared reflectance of the infrared reflective pigment is preferably 15%.

When the infrared reflectance is 15% or higher, heat accumulation in the resulting molded article can be reduced, thereby preventing or reducing deformation such as warpage or damage of the molded article.

The lower limit of the infrared reflectance is more preferably 50%, still more preferably 60% and the upper limit thereof is preferably 80%, more preferably 70%.

The infrared reflectance herein refers to a reflectance of light within a wavelength range of 780 to 1,500 nm.

The infrared reflectance can be measured, for example, with an UV-VIS-NIR spectrophotometer available from Shimadzu Corporation.

The lower limit of the volume average primary particle size of the infrared reflective pigment is preferably 0.1 µm, more preferably 0.2 µm, still more preferably 0.4 µm and the upper limit thereof is preferably 1.0 µm, more preferably 0.8 µm, still more preferably 0.6 µm.

The volume average primary particle size of the infrared reflective pigment can be measured using a device such as a laser diffraction/scattering particle size distribution analyzer, a transmission electron microscope, or a scanning electron microscope.

The lower limit of the refractive index of the infrared reflective pigment is preferably 1.5, more preferably 2.0 and the upper limit thereof is preferably 3.0, more preferably 2.5.

The refractive index can be measured, for example, with a Kalnew precision refractometer available from Shimadzu Corporation.

In the case where the infrared reflective pigment contains a silicate compound, the lower limit of the volume average primary particle size of the silicate compound is preferably 0.1 µm, more preferably 0.2 µm, still more preferably 0.4 µm and the upper limit thereof is preferably 1.0 µm, more preferably 0.8 µm, still more preferably 0.6 µm.

In the case where the infrared reflective pigment contains an inorganic pigment other than the silicate compound, the lower limit of the volume average primary particle size of the inorganic pigment other than the silicate compound is preferably 0.1 µm, more preferably 0.4 µm and the upper limit thereof is preferably 1.0 µm, more preferably 0.6 µm.

In the chlorinated vinyl chloride resin composition for a window frame of the present invention, the lower limit of the amount of the infrared reflective pigment is preferably 0.1 parts by weight, more preferably 0.2 parts by weight, still more preferably 0.4 parts by weight and the upper limit thereof is preferably 10.0 parts by weight, more preferably 8.0 parts by weight, still more preferably 6.0 parts by weight, per 100 parts by weight of the chlorinated vinyl chloride resin.

In the case where the infrared reflective pigment contains a silicate compound, the lower limit of the amount of the silicate compound is preferably 0.1 parts by weight, more preferably 0.2 parts by weight, still more preferably 0.4 parts by weight and the upper limit thereof is preferably 10.0 parts by weight, more preferably 8.0 parts by weight, still more preferably 6.0 parts by weight, per 100 parts by weight of the chlorinated vinyl chloride resin.

In the case where the infrared reflective pigment contains a silicate compound, the lower limit of the amount of the silicate compound in the infrared reflective pigment is preferably 10% by weight, more preferably 20% by weight and the upper limit thereof is preferably 40% by weight, more preferably 35% by weight from the standpoint of weather resistance and chemical resistance.

In the case where the infrared reflective pigment contains an inorganic pigment other than the silicate compound, the lower limit of the amount of the inorganic pigment other than the silicate compound in the infrared reflective pigment is preferably 20% by weight, more preferably 30% by weight and the upper limit thereof is preferably 95% by weight, more preferably 90% by weight from the standpoint of weather resistance and chemical resistance.

In the chlorinated vinyl chloride resin composition for a window frame of the present invention, the lower limit of the amount of the infrared reflective pigment is preferably 0.10% by weight, more preferably 0.20% by weight and the upper limit thereof is preferably 9.0% by weight, more preferably 7.2% by weight.

(Impact Resistance Modifier)

The chlorinated vinyl chloride resin composition for a window frame of the present invention preferably further contains an impact resistance modifier.

The chlorinated vinyl chloride resin composition containing an impact resistance modifier can provide a molded article excellent not only in heat resistance but also in impact resistance.

Examples of the impact resistance modifier include styrene-conjugated diene copolymers and acrylic copolymers.

Examples of a diene component of the styrene-conjugated diene copolymer include butadiene, isoprene, and chloroprene.

The amount of the diene component in the polymer constituting the styrene-conjugated diene copolymer is preferably 55% by weight or less.

More specifically, the styrene-conjugated diene copolymer used is preferably a methyl methacrylate-butadiene-styrene copolymer (MBS), an acrylonitrile-butadiene-styrene copolymer (ABS), a methyl methacrylate-acrylonitrile-butadiene-styrene copolymer (MABS), or the like.

In particular, preferred are/is the methyl methacrylate-butadiene-styrene copolymer and/or the acrylonitrile-butadiene-styrene copolymer.

Examples of the acrylic copolymers include those containing an acrylic acid ester or a methacrylic acid ester as a main component.

The lower limit of the butadiene component content of the styrene-conjugated diene copolymer is preferably 55% and the upper limit thereof is preferably 70%.

When the butadiene content is 55% or higher, the resulting molded article can have sufficient impact resistance. When the butadiene content is 70% or lower, the flowability of the resin composition can be improved.

The butadiene component content of the styrene-conjugated diene copolymer can be obtained by pyrolysis gas chromatograph/mass spectroscopy (PGC-MS) and calculation of the proportion based on the obtained peak areas.

In the chlorinated vinyl chloride resin composition for a window frame of the present invention, the lower limit of the amount of the impact resistance modifier is preferably 4.0 parts by weight, more preferably 6.0 parts by weight and the upper limit thereof is preferably 12.0 parts by weight, more preferably 10.0 parts by weight, per 100 parts by weight of the chlorinated vinyl chloride resin.

When the amount of the impact resistance modifier is not less than the preferable lower limit and not more than the preferable upper limit, the resulting molded article can have further improved impact resistance.

In the chlorinated vinyl chloride resin composition for a window frame of the present invention, the lower limit of the amount of the impact resistance modifier is preferably 2.0% by weight, more preferably 4.0% by weight and the upper limit thereof is preferably 10.0% by weight, more preferably 8.0% by weight.

In the chlorinated vinyl chloride resin composition for a window frame of the present invention, the lower limit of the weight ratio (impact resistance modifier/infrared reflective pigment) of the impact resistance modifier to the infrared reflective pigment is preferably 0.5/1, more preferably 1/1 and the upper limit thereof is preferably 24/1, more preferably 20/1.

The impact resistance modifier is preferably a particular modifier having a small volume average primary particle size. The lower limit of the volume average primary particle size of the impact resistance modifier is preferably 0.1 μm and the upper limit thereof is preferably 0.5 μm.

The volume average primary particle size of the impact resistance modifier can be measured using a device such as a laser diffraction/scattering particle size distribution analyzer, a transmission electron microscope, or a scanning electron microscope.

In the chlorinated vinyl chloride resin composition for a window frame of the present invention, the lower limit of the volume average primary particle size ratio (volume average primary particle size of impact resistance modifier/volume average primary particle size of infrared reflective pigment) of the impact resistance modifier to the infrared reflective pigment is preferably 1/8, more preferably 1/4 and the upper limit thereof is preferably 1/1, more preferably 1/2.

(Lubricant)

The chlorinated vinyl chloride resin composition for a window frame of the present invention may further contain a lubricant. The presence of a lubricant improves the flowability of the resin composition so that the resin composition can exhibit excellent moldability.

Examples of the lubricant include aliphatic hydrogen carbide lubricants, higher fatty acid lubricants, aliphatic alcohol lubricants, fatty acid ester lubricants, and metal soap lubricants.

Examples of the aliphatic hydrogen carbide lubricants include polyethylene wax, montanoic acid wax, and paraffin wax.

Examples of the higher fatty acid lubricants include stearic acid, hydroxystearic acid, and palmitic acid. Examples of the aliphatic alcohol lubricants include stearyl alcohol and cetyl alcohol.

Examples of the fatty acid ester lubricants include triglyceride and butyl stearate.

Examples of the metal soap lubricants include barium stearate, calcium stearate, zinc stearate, aluminum stearate, magnesium stearate, zinc stearate/barium stearate complex, and zinc stearate/calcium stearate complex.

These may be used alone or in combination of two or more.

The lower limit of the amount of the lubricant is preferably 2.0 parts by weight and the upper limit thereof is preferably 6.0 parts by weight, per 100 parts by weight of the chlorinated vinyl chloride resin.

When the amount of the lubricant is not less than the preferable lower limit and not more than the preferable upper limit, the resulting molded article can have excellent appearance.

The lower limit of the amount of the lubricant is more preferably 3.5 parts by weight and the upper limit thereof is more preferably 5.0 parts by weight, per 100 parts by weight of the chlorinated vinyl chloride resin.

(Antioxidant)

The chlorinated vinyl chloride resin composition for a window frame of the present invention preferably further contains an antioxidant.

Examples of the antioxidant include phenol antioxidants, phosphoric acid antioxidants, sulfur antioxidants, and amine antioxidants. These may be used alone or in combination of two or more. Among these, preferred are phenol antioxidants, and particularly preferred are hindered phenol antioxidants.

Examples of the hindered phenol antioxidants include 2,6-di-t-butyl-p-cresol, 2,6-diphenyl-4-octadecyloxy phenol, stearyl (3,5-t-butyl-4-hydroxyphenyl)propionate, distearyl (3,5-t-butyl-4-hydroxybenzyl)phosphonate, 2,2'-methylenebis(4-methyl-6-t-butylphenol), 2,2'-methylenebis (4-ethyl-6-t-butylphenol), bis[3,3-bis(4-hydroxy-3-t-butylphenyl)butyric acid]glycol ester, 4,4'-butylidenebis(6-t-butyl-m-cresol), 2,2'-ethylidenebis(4,6-di-t-butylphenol), 2,2'-ethylidenebis(4-sec-butyl-6-t-butylphenol), 1,1,3-tris (2-methyl-4-hydroxy-5-t-butylphenyl)butane, bis[2-t-butyl-4-methyl-6-(2-hydroxy-3-t-butyl-5-methylbenzyl)phenyl] terephthalate, 1,3,5-tris(2,6-dimethyl-3-hydroxy-4-t-butylbenzyl)isocyanurate, 1,3,5-tris(3,5-di-t-butyl-4-hydroxybenzyl)isocyanurate, 1,3,5-tris(3,5-di-t-butyl-4-hydroxybenzyl)-2,4,6-trimethylbenzene, 1,3,5-tris[(3,5-di-t-butyl-4-hydroxyphenyl)propionyloxyethyl]isocyanurate, pentaerythrityl-tetrakis[methylene-3-(3,5-di-t-butyl-4-hydroxyphenyl)propionate], 2-t-butyl-4-methyl-6-(2'-acryloyloxy-3'-t-butyl-5'-methylbenzyl)phenol, 3,9-bis(1',1'-dimethyl-2'-hydroxyethyl)-2,4,8,10-tetraoxaspiro[5,5] undecane, and bis[β-(3-t-butyl-4-hydroxy-5-methylphenyl) propionate]. Preferred among these are 1,3,5-tris(3,5-di-t-butyl-4-hydroxybenzyl)isocyanurate and pentaerythrityl-tetrakis[methylene-3-(3,5-di-t-butyl-4-hydroxyphenyl) propionate]. These may be used alone or in combination of two or more.

The antioxidant preferable has a loss on heat at 200° C. of less than 5% by weight.

When the loss on heat at 200° C. is 5% by weight or more, the resulting molded article may contain air bubbles to have insufficient strength or a streaky pattern may appear in the vicinity of the surface of the molded article to give a defective appearance.

The loss on heat at 200° C. is more preferably less than 3% by weight.

In the chlorinated vinyl chloride resin composition for a window frame of the present invention, the amount of the antioxidant is preferably 0.1 to 3 parts by weight, more preferably 0.2 to 2.5 parts by weight, per 100 parts by weight of the chlorinated vinyl chloride resin. Containing the antioxidant within this range, the chlorinated vinyl chloride resin composition for a window frame can provide a molded article with less coloring due to yellowing.

The chlorinated vinyl chloride resin composition for a window frame of the present invention may contain additives such as heat stabilizers, stabilization aids, processing aids, heat resistance improvers, ultraviolet absorbers, light stabilizers, fillers, and thermoplastic elastomers, if needed.

The heat stabilizers are not limited, and examples thereof include: organotin stabilizers such as dimethyltin mercapto, dibutyltin mercapto, dioctyltin mercapto, dibutyltin maleate, dibutyltin maleate polymers, dioctyltin maleate, dioctyltin maleate polymers, dibutyltin laurate, and dibutyltin laurate polymers; lead stabilizers such as lead stearate, dibasic lead phosphite, and tribasic lead sulfate; calcium-zinc stabilizers; barium-zinc stabilizers; and barium-cadmium stabilizers. One heat stabilizer may be used alone or two or more stabilizes may be used in combination.

The stabilization aids are not limited, and examples thereof include epoxidized soybean oil, epoxidized linseed oil, epoxidized tetrahydrophthalate, epoxidized polybutadiene, and phosphoric acid esters. One stabilization aid may be used alone or two or more stabilization aids may be used in combination.

The processing aid preferably contains an acrylic resin having a weight average molecular weight of 900,000 to 5,000,000.

Examples of the acrylic resin include acrylic acid, methacrylic acid, homopolymers of (meth)acrylic acid esters, and (meth)acrylic copolymers containing these.

Examples of the (meth)acrylic acid esters include methyl (meth)acrylate, ethyl(meth)acrylate, isopropyl(meth)acrylate, n-butyl(meth)acrylate, and isobutyl(meth)acrylate. Examples of the (meth)acrylic acid esters further include n-amyl(meth)acrylate, isoamyl(meth)acrylate, n-hexyl (meth)acrylate, 2-ethylhexyl(meth)acrylate, and n-octyl (meth)acrylate. The term "(meth)acrylic acid" refers to acrylic acid or methacrylic acid. In the present invention, the acrylic processing aid used is preferably a polymer of methyl(meth)acrylate (MMA).

Any heat resistance improver may be used. Examples thereof include α-methyl styrene resins, and N-phenylmaleimide resins.

Any light stabilizer may be used. Examples thereof include hindered amine light stabilizers.

Any ultraviolet absorber may be used. Examples thereof include salicylic acid ester ultraviolet absorbers, benzophenone ultraviolet absorbers, benzotriazole ultraviolet absorbers, and cyanoacrylate ultraviolet absorbers.

The chlorinated vinyl chloride resin composition for a window frame of the present invention may contain a thermoplastic elastomer to have better workability. Examples of the thermoplastic elastomer include nitrile thermoplastic elastomers, olefin thermoplastic elastomers, vinyl chloride thermoplastic elastomers, styrene thermoplastic elastomers, urethane thermoplastic elastomers, polyester thermoplastic elastomers, and polyamide thermoplastic elastomers.

Examples of the nitrile thermoplastic elastomers include acrylonitrile-butadiene (NBR) copolymers.

Examples of the olefin thermoplastic elastomers include ethylene thermoplastic elastomers such as ethylene-vinyl acetate (EVA) copolymers, ethylene-vinyl acetate-carbon monoxide (EVACO) copolymers.

Examples of the vinyl chloride thermoplastic elastomers include vinyl chloride-vinyl acetate copolymers and vinyl chloride-vinylidene chloride copolymers.

These thermoplastic elastomers may be used alone or in combination of two or more.

The lower limit of the heat distortion temperature (HDT) measured in accordance with ASTM D-648 of the chlorinated vinyl chloride resin composition for a window frame of the present invention is preferably 90° C., more preferably 100° C. and the upper limit thereof is preferably 130° C., more preferably 120° C. When the heat distortion temperature is not lower than the preferable lower limit and not higher than the preferable upper limit, thermal expansion can be reduced.

The lower limit of the notched Izod impact strength measured in accordance with ASTM D-256 of the chlorinated vinyl chloride resin composition for a window frame of the present invention is preferably 80 J/m and the upper limit thereof is preferably 700 J/m. When the Izod impact strength is not lower than the preferable lower limit and not higher than the preferable upper limit, the resulting molded article has excellent impact resistance.

The lower limit of the Izod impact strength is more preferably 265 J/m and the upper limit thereof is more preferably 600 J/m.

The chlorinated vinyl chloride resin composition for a window frame of the present invention preferably has a cell class defined in ASTM D-1784 of at least 2-4-4-4-7. The chlorinated vinyl chloride resin composition having such a cell class can provide a molded article excellent in heat resistance and impact resistance.

The lower limit of the melt flow rate (MFR) of the chlorinated vinyl chloride resin composition for a window frame of the present invention is preferably 0.4 g/10 min, more preferably 0.8 g/10 min and the upper limit thereof is preferably 10.0 g/10 min, more preferably 6.0 g/10 min.

The MFR can be measured by a method in accordance with JIS K7210.

The chlorinated vinyl chloride resin composition for a window frame of the present invention can be produced by, for example, the following method. A vinyl chloride resin is suspended in an aqueous medium in a reaction vessel to prepare a suspension. Chlorine was introduced into the reaction vessel to chlorinate the vinyl chloride resin by any conventionally known method, thereby preparing a chlorinated vinyl chloride resin. Then, to the chlorinated vinyl chloride resin was added the infrared reflective pigment and a styrene-conjugated diene copolymer, followed by mixing.

The chlorinated vinyl chloride resin composition for a window frame of the present invention may be molded by any molding method to provide a molded article.

The molding method may be any conventionally known method, such as extrusion molding or injection molding.

The molded article of the present invention is excellent in heat resistance and impact resistance, and is less likely to be deteriorated by exposure to heat or light of sunlight or damaged upon application of an impact. Moreover, heat accumulation in the molded article of the present invention is suppressed, leading to less damage caused by deformation such as warpage. Accordingly, the molded article of the present invention is suitably used as a housing material such as a window frame member. The present invention also encompasses a window frame member that is a molded article of the chlorinated vinyl chloride resin composition for a window frame of the present invention.

The molded article preferably has a surface roughness (Rmax) on the surface of 2 μm or less.

The molded article preferably has a filtered waviness center line average (WcA) on the surface of 2 μm or less. The molded article preferably has a filtered waviness unevenness (Wct) of 10 μm or less.

The surface roughness (Rmax) can be measured by a method in accordance with JIS B 0601. The filtered waviness center line average (WcA) and filtered waviness unevenness (Wct) can be measured by a method in accordance with JIS B 0610.

Advantageous Effects of Invention

The present invention can provide a chlorinated vinyl chloride resin composition for a window frame having excellent properties including moldability, heat resistance, and impact resistance and capable of preventing or reducing deformation such as warpage or damage even after exposure to sunlight for a long time.

The present invention can also provide a chlorinated vinyl chloride resin composition for a window frame having excellent chemical resistance to prevent or reduce deterioration of a molded article thereof such as discoloration due to acid rain.

DESCRIPTION OF EMBODIMENTS

The present invention is more specifically described with reference to, but not limited to, the following examples.

Example 1

(Preparation of Chlorinated Vinyl Chloride Resin Composition for Window Frame)

To 100 parts by weight of a chlorinated vinyl chloride resin (chlorine content: 67.3% by weight, average degree of polymerization: 700) were added 0.7 parts by weight of an infrared reflective pigment and 8.0 parts by weight of an impact resistance modifier, and mixed.

To the mixture were further added a lubricant, a heat stabilizer, and an antioxidant in accordance with Table 1. The materials were uniformly mixed using a super mixer, thereby preparing a chlorinated vinyl chloride resin composition for a window frame.

The raw materials used are listed below.
(Infrared Reflective Pigment)
  Azo pigment: 1-{4-[(4,5,6,7-Tetrachloro-3-oxoisoindoline-1-ylidene)amino]phenylazo}-2-hydroxy-N-(4'-carboxamide, CHROMOFINE BLACK A1103 available from Dainichiseika Color & Chemicals Mfg. Co., Ltd., volume average primary particle size of 0.1 μm, infrared reflectance of 71%
(Impact Resistance Modifier)
  Methyl methacrylate-butadiene-styrene (MBS) copolymer: 20% by weight of methyl methacrylate component, 65% by weight of butadiene component, and 15% by weight of styrene component, B-564 available from Kaneka Corporation, volume average primary particle size of 0.2 μm (Lubricant)
  Partially saponified ester wax, Licowax OP available from Clariant AG
(Heat Stabilizer)
  Dibutyltin mercapto stabilizer, TVS #1380 available from Nitto Kasei Co., Ltd.
(Antioxidant)
  Hindered phenol antioxidant, Irganox1010 available from BASF SE
(Production of Extrusion Molded Article)

The obtained chlorinated vinyl chloride resin composition for a window frame was fed to a twin-screw counter-rotating conical extruder ("SLM-50" available from Osada Seisakusho) with a diameter of 50 mm. The resin composition was extruded at a resin temperature of 209.0° C., a back pressure of 280.0 kg/cm$^2$, and an extrusion amount of 25.0 kg/hr. Thus, a molded article as a window frame member was produced.

Examples 2 to 29, Comparative Examples 1 and 2

Chlorinated vinyl chloride resin compositions for a window frame and molded articles were produced as in Example 1, except that a chlorinated vinyl chloride resin, a vinyl chloride resin, an infrared reflective pigment, an infrared absorbing pigment, an impact resistance modifier, an infrared reflectance aid, a lubricant, a heat stabilizer, and an antioxidant used were each of the type and in an amount as shown in Tables 1 and 2.

The raw materials used are listed below.

The infrared reflectance of the infrared reflective pigment was measured with an UV-VIS-NIR spectrophotometer available from Shimadzu Corporation. In the case where multiple infrared reflective pigments were contained, the infrared reflectance of the mixture of the infrared reflective pigments was measured. Tables 1 and 2 show the results.
(Infrared Reflective Pigment)
  Perylene pigment: 2,9-Bis[(4-methoxyphenyl)methyl]-anthra[2,1,9-def:6,5,10-D',E',F'-]diisoquinoline-1,3,8,10(2H,9H)-tetrone, PALIOGEN Black L 0086 available from BASF SE, volume average primary particle size of 0.1 μm, infrared reflectance of 68%
  Pigment Blue 29: Gunjo 2400 available from Daiichi-Kasei Co., Ltd., silicate compound, volume average primary particle size of 0.5 μm, infrared reflectance of 57%
  Pigment Violet 15: Daiichi Violet available from Daiichi-Kasei Co., Ltd., silicate compound, volume average primary particle size of 0.5 μm, infrared reflectance of 52%
  Titanium oxide: TIPAQUE CR-90 available from Ishihara Sangyo Kaisha, Ltd., volume average primary particle size of 0.25 μm
  Calcium carbonate: Hakuenka CCR available from Shiraishi Kogyo, volume average primary particle size of 0.08 μm
(Infrared Absorbing Pigment)
  Carbon black: RCF #45 available from Mitsubishi Chemical Corporation, volume average primary particle size of 0.03 μm
(Impact Resistance Modifier)
  Acrylonitrile-butadiene-styrene (ABS) copolymer: 35% by weight of acrylonitrile component, 53% by weight of butadiene component, and 12% by weight of styrene component, Blendex338 available from Galata Chemicals, volume average primary particle size of 1.0 μm Methyl methacrylate-butadiene-styrene (MBS) copolymer: 25% by weight of methyl methacrylate component, 50% by weight of butadiene component, and 25% by weight of styrene component, MB-838A available from LG Chem Ltd., volume average primary particle size of 0.2 μm Methyl methacrylate-butadiene-styrene (MBS) copolymer: 10% by weight of methyl methacrylate component, 80% by weight of butadiene component, and 10% by weight of styrene component, BTA751 available from The Dow Chemical Company, volume average primary particle size of 0.2 μm <Evaluation>

The following evaluations were performed on the chlorinated vinyl chloride resin compositions for a window frame and molded articles obtained in the examples and comparative examples. Tables 1 and 2 show the results.

(Evaluation on Chlorinated Vinyl Chloride Resin Composition for Window Frame)

<Mechanical Properties (Izod Impact Strength, Tensile Strength, Tensile Modulus of Elasticity, Thermal Deformation Temperature, MFR)>

Each of the obtained chlorinated vinyl chloride resin compositions for a window frame was fed into a roll mill with two 8-inch rolls. The resin composition was kneaded at 205° C. for three minutes and formed into 1.0-mm-thick sheets. The obtained sheets were layered on top of each other, preheated with a press at 205° C. for three minutes, and then pressurized for four minutes. Thus, a press plate having a thickness of 3 mm was obtained. A specimen was cut out from the obtained press plate by machine processing. The Izod impact strength was measured in accordance with ASTM D-256 and the tensile strength and tensile modulus of elasticity were measured in accordance with ASTM D-638 using this specimen.

The thermal deformation temperature was measured at a load of 186 N/cm² in accordance with ASTM D-648. Before measurement of the thermal deformation temperature, the press plate was annealed in a gear oven at 100° C. for 24 hours.

The MFR was measured in accordance with JIS K7210.

(Evaluation on Molded Article)
<Heat Accumulation>

A specimen having a width of 10 mm and a length of 200 mm was cut out from each of the obtained molded articles.

The specimen was irradiated with infrared rays using a three-bulb infrared lamp (F-2B available from Kett Electric Laboratory) as a light source at a distance from the light source to the specimen of 30 cm. The specimen was irradiated with infrared rays for 10 minutes, and the temperature of the specimen was measured every minute from the start of the irradiation using an infrared thermal imaging camera (CPE-E4 available from Flir Systems, Inc.).

<Infrared Reflectance>

The infrared reflectance in the infrared region (700 nm to 1,700 nm) of each of the obtained molded articles was measured with a spectrophotometer. The infrared reflectance was calculated based on the integrals within an arbitrary range of reflectance and transmittance curves. In the calculation, the equation: reflectance+transmittance+absorbance=100% was satisfied.

<Surface Roughness>

The surface roughness Ra of each of the obtained molded articles was measured with a surface roughness meter (available from Mitsutoyo Corporation).

<Weather Resistance>

The obtained molded articles were each placed in an UV long-life fade meter (available from Suga Test Instruments Co., Ltd.) and the test was carried out for 500 hours. The color change before and after the test was observed using a colorimeter NR-3000 available from Nippon Denshoku Industries Co., Ltd. The color difference ΔE value was evaluated based on the following criteria.
  ⊙⊙ (Excellent): Less than ΔE 2.0
  ⊙ (Good): ΔE 2.0 or more and less than 6.0
  Δ (Fair): ΔE 6.0 or more and less than 15.0
  x (Poor): ΔE 15.0 or more <Chemical Resistance>

The obtained molded articles were each immersed in nitric acid having a concentration of 70% by weight for three weeks. The color change before and after the immersion was observed using a colorimeter NR-3000 available from Nippon Denshoku Industries Co., Ltd. The color difference ΔE value was evaluated based on the following criteria.
  ⊙⊙ (Excellent): Less than ΔE 8.0
  ⊙ (Good): ΔE 8.0 or more and less than 15.0
  Δ (Fair): ΔE 15.0 or more and less than 30.0
  x (Poor): ΔE 30.0 or more

TABLE 1

| | | | Example | | | | | | | |
|---|---|---|---|---|---|---|---|---|---|---|
| | | | 1 | 2 | 3 | 4 | 5 | 6 | 7 | 8 |
| Formulation of resin composition (parts by weight) | Chlorinated vinyl chloride resin | Amount | 100 | 100 | 100 | 100 | 100 | 100 | 100 | 100 |
| | | Average degree of polymerization | 700 | 400 | 1200 | 700 | 700 | 700 | 700 | 700 |
| | | Chlorine content (wt %) | 67.3 | 67.3 | 67.3 | 62.0 | 70.0 | 67.3 | 67.3 | 67.3 |
| | | Proportion of structural unit (a) (mol %) | | | | | | | | |
| | | Proportion of structural unit (b) (mol %) | | | | | | | | |
| | | Proportion of structural unit (c) (mol %) | | | | | | | | |
| | Vinyl chloride resin | Amount (parts by weight) | — | — | — | — | — | — | — | — |
| | | Degree of polymerization | — | — | — | — | — | — | — | — |
| | | Chlorine content (wt %) | — | — | — | — | — | — | — | — |
| | Infrared reflective pigment | Azo pigment | 0.7 | 0.7 | 0.7 | 0.7 | 0.7 | — | — | 0.7 |
| | | Perylene pigment | — | — | — | — | — | — | — | — |
| | | Pigment Blue 29 | — | — | — | — | — | 0.7 | — | — |
| | | Pigment Violet 15 | — | — | — | — | — | — | 0.7 | — |
| | | Titanium oxide | — | — | — | — | — | — | — | 4.0 |
| | | Calcium carbonate | — | — | — | — | — | — | — | — |
| | | Infrared reflectance (%) | 71 | 71 | 71 | 71 | 71 | 57 | 52 | 80 |

TABLE 1-continued

|  |  |  |  |  |  |  |  |  |  |
|---|---|---|---|---|---|---|---|---|---|
| | Infrared absorbing pigment | Carbon black | — | — | — | — | — | — | — | — |
| | Impact resistance modifier | MBS (Butadiene component of 65 wt %) | 8.0 | 8.0 | 8.0 | 8.0 | 8.0 | 8.0 | 8.0 | 8.0 |
| | | MBS (Butadiene component of 50 wt %) | — | — | — | — | — | — | — | — |
| | | MBS (Butadiene component of 80 wt %) | — | — | — | — | — | — | — | — |
| | | ABS | — | — | — | — | — | — | — | — |
| | Lubricant | Partially saponified ester wax | 4.0 | 4.0 | 4.0 | 4.0 | 4.0 | 4.0 | 4.0 | 4.0 |
| | Heat stabilizer | Dibutyltin mercapto stabilizer | 2.0 | 2.0 | 2.0 | 2.0 | 2.0 | 2.0 | 2.0 | 2.0 |
| | Antioxidant | Hindered phenol antioxidant | 0.5 | 0.5 | 0.5 | 0.5 | 0.5 | 0.5 | 0.5 | 0.5 |
| Evaluation (resin composition) | Izod impact strength (J/m) | | 400 | 240 | 580 | 480 | 360 | 400 | 400 | 370 |
| | Tensile strength (MPa) | | 49.0 | 48.5 | 50.0 | 45.2 | 53.0 | 49.3 | 49.1 | 48.6 |
| | Tensile modulus of elasticity (MPa) | | 2750 | 2600 | 2820 | 2510 | 2880 | 2720 | 2740 | 2620 |
| | Thermal deformation temperature (° C.) | | 102 | 101 | 102 | 90 | 110 | 101 | 102 | 101 |
| | MFR (g/10 min) | | 2.5 | 3.3 | 0.8 | 5.8 | 1.2 | 2.5 | 2.5 | 2.3 |
| Evaluation (molded article) | Heat accumulation (° C.) | 2 minutes later | 45 | 44 | 45 | 45 | 45 | 50 | 52 | 42 |
| | | 5 minutes later | 55 | 55 | 56 | 55 | 55 | 61 | 63 | 52 |
| | | 10 minutes later | 60 | 60 | 61 | 59 | 60 | 66 | 67 | 56 |
| | Infrared reflectance (%) | | 20 | 19 | 18 | 21 | 20 | 10 | 8 | 30 |
| | Surface roughness = Rmax (μm) | | 1.2 | 0.2 | 6.5 | 0.6 | 5.9 | 1.3 | 1.1 | 1.5 |
| | Weather resistance | Evaluation | Δ | Δ | Δ | Δ | Δ | ⊙⊙ | ○ | ○ |
| | | ΔE | 7.9 | 7.7 | 8.1 | 7.4 | 9.2 | 1.8 | 2.2 | 4.6 |
| | Chemical resistance | Evaluation | ○ | Δ | ○ | Δ | ○ | ○ | ○ | ○ |
| | | ΔE | 14.8 | 16.3 | 12.2 | 19.2 | 10.5 | 8.8 | 11.4 | 12.8 |

| | | | Example | | | | | | |
|---|---|---|---|---|---|---|---|---|---|
| | | | 9 | 10 | 11 | 12 | 13 | 14 | 15 |
| Formulation of resin composition (parts by weight) | Chlorinated vinyl chloride resin | Amount | 100 | 100 | 100 | 100 | 100 | 100 | 100 |
| | | Average degree of polymerization | 700 | 700 | 700 | 700 | 700 | 700 | 700 |
| | | Chlorine content (wt %) | 67.3 | 67.3 | 67.3 | 67.3 | 67.3 | 67.3 | 67.3 |
| | | Proportion of structural unit (a) (mol %) | | | | | | | |
| | | Proportion of structural unit (b) (mol %) | | | | | | | |
| | | Proportion of structural unit (c) (mol %) | | | | | | | |
| | Vinyl chloride resin | Amount (parts by weight) | — | — | — | — | — | — | — |
| | | Degree of polymerization | — | — | — | — | — | — | — |
| | | Chlorine content (wt %) | — | — | — | — | — | — | — |
| | Infrared reflective pigment | Azo pigment | 0.7 | 0.7 | 0.7 | 0.7 | 0.7 | 0.7 | 0.7 |
| | | Perylene pigment | — | — | — | — | — | — | — |
| | | Pigment Blue 29 | — | — | — | — | — | — | — |
| | | Pigment Violet 15 | — | — | — | — | — | — | — |
| | | Titanium oxide | — | 0.5 | 10.0 | — | — | — | — |
| | | Calcium carbonate | 4.0 | — | — | — | — | — | — |
| | | Infrared reflectance (%) | 73 | 75 | 86 | 71 | 71 | 71 | 71 |
| | Infrared absorbing pigment | Carbon black | — | — | — | — | — | — | — |
| | Impact resistance modifier | MBS (Butadiene component of 65 wt %) | 8.0 | 8.0 | 8.0 | — | — | 2.0 | 14.0 |
| | | MBS (Butadiene component of 50 wt %) | — | — | — | — | — | — | — |
| | | MBS (Butadiene component of 80 wt %) | — | — | — | — | — | — | — |
| | | ABS | — | — | — | — | 8.0 | — | — |
| | Lubricant | Partially saponified ester wax | 4.0 | 4.0 | 4.0 | 4.0 | 4.0 | 4.0 | 4.0 |
| | Heat stabilizer | Dibutyltin mercapto stabilizer | 2.0 | 2.0 | 2.0 | 2.0 | 2.0 | 2.0 | 2.0 |
| | Antioxidant | Hindered phenol antioxidant | 0.5 | 0.5 | 0.5 | 0.5 | 0.5 | 0.5 | 0.5 |
| Evaluation (resin composition) | Izod impact strength (J/m) | | 330 | 390 | 340 | 25 | 420 | 120 | 650 |
| | Tensile strength (MPa) | | 48.5 | 49.0 | 47.2 | 52.1 | 48.8 | 51.1 | 45.0 |
| | Tensile modulus of elasticity (MPa) | | 2610 | 2710 | 2530 | 2850 | 2760 | 2800 | 2490 |
| | Thermal deformation temperature (° C.) | | 102 | 102 | 101 | 105 | 102 | 103 | 100 |
| | MFR (g/10 min) | | 2.4 | 2.5 | 2.3 | 2.8 | 2.6 | 2.7 | 2.2 |
| Evaluation (molded article) | Heat accumulation (° C.) | 2 minutes later | 44 | 44 | 41 | 45 | 45 | 45 | 45 |
| | | 5 minutes later | 54 | 54 | 51 | 56 | 55 | 55 | 55 |
| | | 10 minutes later | 58 | 57 | 54 | 61 | 60 | 61 | 60 |
| | Infrared reflectance (%) | | 22 | 24 | 40 | 18 | 20 | 19 | 20 |

TABLE 1-continued

|  |  |  |  |  |  |  |  |
|---|---|---|---|---|---|---|---|
| Surface roughness = Rmax (μm) | 1.8 | 1.4 | 1.7 | 0.9 | 1.4 | 1.1 | 2.0 |
| Weather Evaluation | Δ | Δ | ○○ | Δ | Δ | Δ | Δ |
| resistance ΔE | 8 | 6.3 | 1.5 | 6.5 | 8.8 | 7.2 | 9.5 |
| Chemical Evaluation | ○ | ○ | ○ | ○○ | ○ | ○○ | Δ |
| resistance ΔE | 13.6 | 13.7 | 11.3 | 4.9 | 14.1 | 7.4 | 22.2 |

TABLE 2

|  |  |  | Example |  |  |  |  |  |  |  |
|---|---|---|---|---|---|---|---|---|---|---|
|  |  |  | 16 | 17 | 18 | 19 | 20 | 21 | 22 | 23 |
| Formulation of resin composition (parts by weight) | Chlorinated vinyl chloride resin | Amount | 100 | 100 | 100 | 100 | 100 | 100 | 100 | 100 |
|  |  | Average degree of polymerization | 700 | 700 | 700 | 700 | 700 | 700 | 700 | 700 |
|  |  | Chlorine content (wt %) | 67.3 | 67.3 | 67.3 | 67.3 | 67.3 | 67.3 | 67.3 | 67.3 |
|  |  | Proportion of structural unit (a) (mol %) |  |  |  |  |  |  |  |  |
|  |  | Proportion of structural unit (b) (mol %) |  |  |  |  |  |  |  |  |
|  |  | Proportion of structural unit (c) (mol %) |  |  |  |  |  |  |  |  |
|  | Vinyl chloride resin | Amount (parts by weight) | — | — | — | — | — | — | — | — |
|  |  | Degree of polymerization | — | — | — | — | — | — | — | — |
|  |  | Chlorine content (wt %) | — | — | — | — | — | — | — | — |
|  | Infrared reflective pigment | Azo pigment | 0.7 | 0.7 | 0.2 | 9.8 | — | — | — | — |
|  |  | Perylene pigment | — | — | — | — | 0.7 | — | — | — |
|  |  | Pigment Blue 29 | — | — | — | — | — | 0.2 | 9.8 | — |
|  |  | Pigment Violet 15 | — | — | — | — | — | — | — | 0.2 |
|  |  | Titanium oxide | — | — | — | — | — | — | — | — |
|  |  | Calcium carbonate | — | — | — | — | — | — | — | — |
|  |  | Infrared reflectance (%) | 71 | 71 | 71 | 71 | 68 | 57 | 57 | 52 |
|  | Infrared absorbing pigment | Carbon black | — | — | — | — | — | — | — | — |
|  | Impact resistance modifier | MBS (Butadiene component of 65 wt %) | 8.0 | 8.0 | 8.0 | 8.0 | 8.0 | 8.0 | 8.0 | 8.0 |
|  |  | MBS (Butadiene component of 50 wt %) | — | — | — | — | — | — | — | — |
|  |  | MBS (Butadiene component of 80 wt %) | — | — | — | — | — | — | — | — |
|  |  | ABS | — | — | — | — | — | — | — | — |
|  | Lubricant | Partially saponified ester wax | 1.0 | 8.0 | 4.0 | 4.0 | 4.0 | 4.0 | 4.0 | 4.0 |
|  | Heat stabilizer | Dibutyltin mercapto stabilizer | 2.0 | 2.0 | 2.0 | 2.0 | 2.0 | 2.0 | 2.0 | 2.0 |
|  | Antioxidant | Hindered phenol antioxidant | 0.5 | 0.5 | 0.5 | 0.5 | 0.5 | 0.5 | 0.5 | 0.5 |
| Evaluation (resin composition) | Izod impact strength (J/m) |  | 410 | 370 | 400 | 370 | 400 | 420 | 370 | 430 |
|  | Tensile strength (MPa) |  | 48.9 | 48.3 | 49.1 | 48.3 | 49.0 | 49.3 | 49.5 | 49.1 |
|  | Tensile modulus of elasticity (MPa) |  | 2710 | 2690 | 2750 | 2590 | 2750 | 2680 | 2740 | 2690 |
|  | Thermal deformation temperature (° C.) |  | 102 | 101 | 102 | 100 | 102 | 100 | 103 | 101 |
|  | MFR (g/10 min) |  | 1.8 | 3.6 | 2.5 | 3.3 | 2.5 | 2.5 | 2.3 | 2.5 |
| Evaluation (molded article) | Heat accumulation (° C.) | 2 minutes later | 45 | 44 | 53 | 38 | 46 | 57 | 44 | 57 |
|  |  | 5 minutes later | 56 | 55 | 64 | 48 | 56 | 68 | 54 | 59 |
|  |  | 10 minutes later | 60 | 60 | 68 | 50 | 61 | 73 | 58 | 73 |
|  | Infrared reflectance (%) |  | 20 | 19 | 7 | 48 | 17 | 9 | 24 | 7 |
|  | Surface roughness = Rmax (μm) |  | 0.2 | 5 | 0.5 | 3 | 1.3 | 1.2 | 2.8 | 1 |
|  | Weather resistance | Evaluation | Δ | Δ | Δ | ○ | Δ | ○○ | ○○ | ○ |
|  |  | ΔE | 8.2 | 7.8 | 11.0 | 3.5 | 14.5 | 1.9 | 0.7 | 3.5 |
|  | Chemical resistance | Evaluation | ○ | Δ | Δ | ○ | Δ | ○ | ○○ | ○ |
|  |  | ΔE | 13.2 | 16.5 | 17.2 | 8.5 | 27.9 | 14.2 | 7.9 | 14.9 |

|  |  |  | Example |  |  |  |  |  | Comparative Example |  |
|---|---|---|---|---|---|---|---|---|---|---|
|  |  |  | 24 | 25 | 26 | 27 | 28 | 29 | 1 | 2 |
| Formulation of resin composition (parts by weight) | Chlorinated vinyl chloride resin | Amount | 100 | 100 | 100 | 100 | 100 | 100 | 100 | — |
|  |  | Average degree of polymerization | 700 | 700 | 700 | 700 | 700 | 700 | 700 | — |
|  |  | Chlorine content (wt %) | 67.3 | 67.3 | 67.3 | 67.3 | 67.3 | 67.3 | 67.3 | — |
|  |  | Proportion of structural unit (a) (mol %) |  |  |  |  |  |  |  |  |
|  |  | Proportion of structural unit (b) (mol %) |  |  |  |  |  |  |  |  |

TABLE 2-continued

| | | | | | | | | | | |
|---|---|---|---|---|---|---|---|---|---|---|
| | | Proportion of structural unit (c) (mol %) | — | — | — | — | — | — | — | 100 |
| | Vinyl chloride resin | Amount (parts by weight) | — | — | — | — | — | — | — | 100 |
| | | Degree of polymerization | — | — | — | — | — | — | — | 700 |
| | | Chlorine content (wt %) | — | — | — | — | — | — | — | 56.7 |
| | Infrared reflective pigment | Azo pigment | — | — | — | — | 0.7 | 0.7 | — | 0.7 |
| | | Perylene pigment | — | — | — | — | — | — | — | — |
| | | Pigment Blue 29 | — | 0.7 | 0.7 | 0.7 | — | — | — | — |
| | | Pigment Violet 15 | 9.8 | — | — | — | — | — | — | — |
| | | Titanium oxide | — | 4.0 | 0.5 | 10.0 | — | — | — | — |
| | | Calcium carbonate | — | — | — | — | — | — | — | — |
| | | Infrared reflectance (%) | 52 | 69 | 61 | 78 | 71 | 71 | — | 71 |
| | Infrared absorbing pigment | Carbon black | — | — | — | — | — | — | 0.7 | — |
| | Impact resistance modifier | MBS (Butadiene component of 65 wt %) | 8.0 | 8.0 | 8.0 | 8.0 | — | — | 8.0 | 8.0 |
| | | MBS (Butadiene component of 50 wt %) | — | — | — | — | 8.0 | — | — | — |
| | | MBS (Butadiene component of 80 wt %) | — | — | — | — | — | 8.0 | — | — |
| | | ABS | — | — | — | — | — | — | — | — |
| | Lubricant | Partially saponified ester wax | 4.0 | 4.0 | 4.0 | 4.0 | 4.0 | 4.0 | 4.0 | 4.0 |
| | Heat stabilizer | Dibutyltin mercapto stabilizer | 2.0 | 2.0 | 2.0 | 2.0 | 2.0 | 2.0 | 2.0 | 2.0 |
| | Antioxidant | Hindered phenol antioxidant | 0.5 | 0.5 | 0.5 | 0.5 | 0.5 | 0.5 | 0.5 | 0.5 |
| Evaluation (resin composition) | | Izod impact strength (J/m) | 380 | 390 | 400 | 370 | 200 | 620 | 400 | 560 |
| | | Tensile strength (MPa) | 49.3 | 49.8 | 49.3 | 50.0 | 49.5 | 48.8 | 49.1 | 40.3 |
| | | Tensile modulus of elasticity (MPa) | 2760 | 2750 | 2720 | 2790 | 2710 | 2680 | 2730 | 2420 |
| | | Thermal deformation temperature (° C.) | 104 | 103 | 101 | 105 | 101 | 102 | 101 | 69 |
| | | MFR (g/10 min) | 2.3 | 2.1 | 2.5 | 2 | 3.5 | 0.7 | 2.5 | 23.9 |
| Evaluation (molded article) | Heat accumulation (° C.) | 2 minutes later | 44 | 45 | 49 | 43 | 46 | 45 | 77 | 46 |
| | | 5 minutes later | 55 | 56 | 58 | 52 | 54 | 56 | 84 | 54 |
| | | 10 minutes later | 60 | 61 | 64 | 57 | 61 | 61 | 90 | 59 |
| | | Infrared reflectance (%) | 19 | 18 | 12 | 28 | 20 | 19 | 2 | 20 |
| | | Surface roughness = Rmax (μm) | 2.6 | 1.7 | 1.4 | 2.1 | 1.1 | 2.1 | 1.3 | 0.5 |
| | Weather resistance | Evaluation | ◯◯ | ◯◯ | ◯◯ | ◯◯ | Δ | Δ | ◯◯ | Δ |
| | | ΔE | 1.7 | 0.9 | 1.1 | 0.3 | 7.2 | 9.1 | 0.3 | 6.5 |
| | Chemical resistance | Evaluation | ◯ | ◯◯ | ◯◯ | ◯◯ | ◯ | Δ | ◯ | X |
| | | ΔE | 10.1 | 7.1 | 7.8 | 6.6 | 11.1 | 17.2 | 11.1 | 33.5 |

INDUSTRIAL APPLICABILITY

The present invention can provide a chlorinated vinyl chloride resin composition for a window frame having excellent properties including moldability, heat resistance, and impact resistance and capable of preventing or reducing deformation such as warpage or damage even after exposure to sunlight for a long time.

The invention claimed is:

1. A chlorinated vinyl chloride resin composition for a window frame, comprising:
    a chlorinated vinyl chloride resin; and
    an infrared reflective pigment,
    the infrared reflective pigment containing a silicate compound having a volume average primary particle size of 0.1 to 1.0 μm.

2. The chlorinated vinyl chloride resin composition for a window frame according to claim 1,
    wherein the chlorinated vinyl chloride resin has an average degree of polymerization of 500 to 1,000.

3. The chlorinated vinyl chloride resin composition for a window frame according to claim 1,
    wherein the chlorinated vinyl chloride resin has a chlorine content of 63 to 69% by weight.

4. The chlorinated vinyl chloride resin composition for a window frame according to claim 1,
    wherein the infrared reflective pigment has an infrared reflectance of 15% or higher.

5. The chlorinated vinyl chloride resin composition for a window frame according to claim 1, comprising the infrared reflective pigment in an amount of 0.1 to 10.0 parts by weight per 100 parts by weight of the chlorinated vinyl chloride resin.

6. The chlorinated vinyl chloride resin composition for a window frame according to claim 1, further comprising an impact resistance modifier.

7. The chlorinated vinyl chloride resin composition for a window frame according to claim 6,
    wherein the impact resistance modifier is a styrene-conjugated diene copolymer or an acrylic copolymer.

8. The chlorinated vinyl chloride resin composition for a window frame according to claim 6, comprising the impact resistance modifier in an amount of 4.0 to 12.0 parts by weight per 100 parts by weight of the chlorinated vinyl chloride resin.

9. The chlorinated vinyl chloride resin composition for a window frame according to claim 1, further comprising a lubricant.

10. The chlorinated vinyl chloride resin composition for a window frame according to claim 9,
    wherein the lubricant is at least one selected from the group consisting of an aliphatic hydrogen carbide lubricant, a higher fatty acid lubricant, an aliphatic alcohol lubricant, an aliphatic ester lubricant, and a metal soap lubricant.

11. The chlorinated vinyl chloride resin composition for a window frame according to claim 9, comprising the lubricant in an amount of 2.0 to 6.0 parts by weight per 100 parts by weight of the chlorinated vinyl chloride resin.

12. A window frame member comprising a molded article of the chlorinated vinyl chloride resin composition for a window frame according to claim 1.

* * * * *